United States Patent
Huart et al.

(10) Patent No.: US 7,023,971 B1
(45) Date of Patent: Apr. 4, 2006

(54) METHOD AND SYSTEM FOR CALL ANSWER WHILE CONNECTED TO VOICE MAIL

(75) Inventors: Pascal H. Huart, Dallas, TX (US); Luke K. Surazski, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 726 days.

(21) Appl. No.: 09/703,341

(22) Filed: Oct. 31, 2000

(51) Int. Cl.
H04M 11/00 (2006.01)

(52) U.S. Cl. .................... 379/88.18; 370/394; 704/220

(58) Field of Classification Search .......... 379/265.09, 379/88.22, 88.23, 88.25, 88.26, 88.27, 142.02, 379/215.01, 67.1, 75, 88.19, 88.28, 88.17, 379/142.08; 370/252
See application file for complete search history.

(56) References Cited

U.S. PATENT DOCUMENTS

| 5,652,789 A | 7/1997 | Miner et al. ............... 379/201 |
| 5,717,741 A | 2/1998 | Yue et al. ..................... 379/67 |
| 5,857,013 A * | 1/1999 | Yue et al. .................. 379/88.2 |
| 5,894,504 A | 4/1999 | Alfred et al. ............ 379/88.13 |
| 6,021,181 A | 2/2000 | Miner et al. ............ 379/88.23 |
| 6,047,053 A | 4/2000 | Miner et al. ............... 379/201 |
| 6,192,116 B1 | 2/2001 | Mayak ....................... 379/142 |
| 6,192,120 B1 | 2/2001 | Yamagishi et al. ......... 379/215 |
| 6,212,261 B1 | 4/2001 | Meubus et al. .......... 379/88.12 |
| 6,259,471 B1 | 7/2001 | Peters et al. .................. 348/17 |
| 6,282,270 B1 * | 8/2001 | Porter ..................... 379/88.17 |
| 6,337,898 B1 | 1/2002 | Gordon ..................... 379/67.1 |
| 6,343,121 B1 | 1/2002 | Infosino ................ 379/215.01 |
| 6,385,202 B1 * | 5/2002 | Katseff et al. ............. 370/401 |
| 6,396,908 B1 * | 5/2002 | O'Donovan et al. ..... 379/88.18 |
| 6,434,143 B1 * | 8/2002 | Donovan ................ 379/88.17 |
| 6,463,146 B1 * | 10/2002 | Hartley et al. ......... 379/215.01 |
| 6,487,196 B1 | 11/2002 | Verthein et al. ............ 370/352 |
| 6,507,646 B1 | 1/2003 | Fishler .................. 379/215.01 |
| 6,560,224 B1 | 5/2003 | Kung et al. ................. 370/356 |
| 6,757,256 B1 * | 6/2004 | Anandakumar et al. .... 370/252 |

\* cited by examiner

*Primary Examiner*—Fan Tsang
*Assistant Examiner*—Gerald Gauthier
(74) *Attorney, Agent, or Firm*—Baker Botts L.L.P.

(57) ABSTRACT

A method and system for call answer while connected to voice mail includes generating real-time packets for transmission of a message toward a voice mail system. Generation of the real-time packets is interrupted upon a call answer by a party generating the message. Generation of the real-time packets for transmission of the message toward the voice mail system is resumed after a delay associated with the call answer. An indication is provided to the voice mail system that the real-time packets generated subsequent to the delay follow the real-time packets generated prior to the delay in the message by a time amount less than the delay.

54 Claims, 3 Drawing Sheets

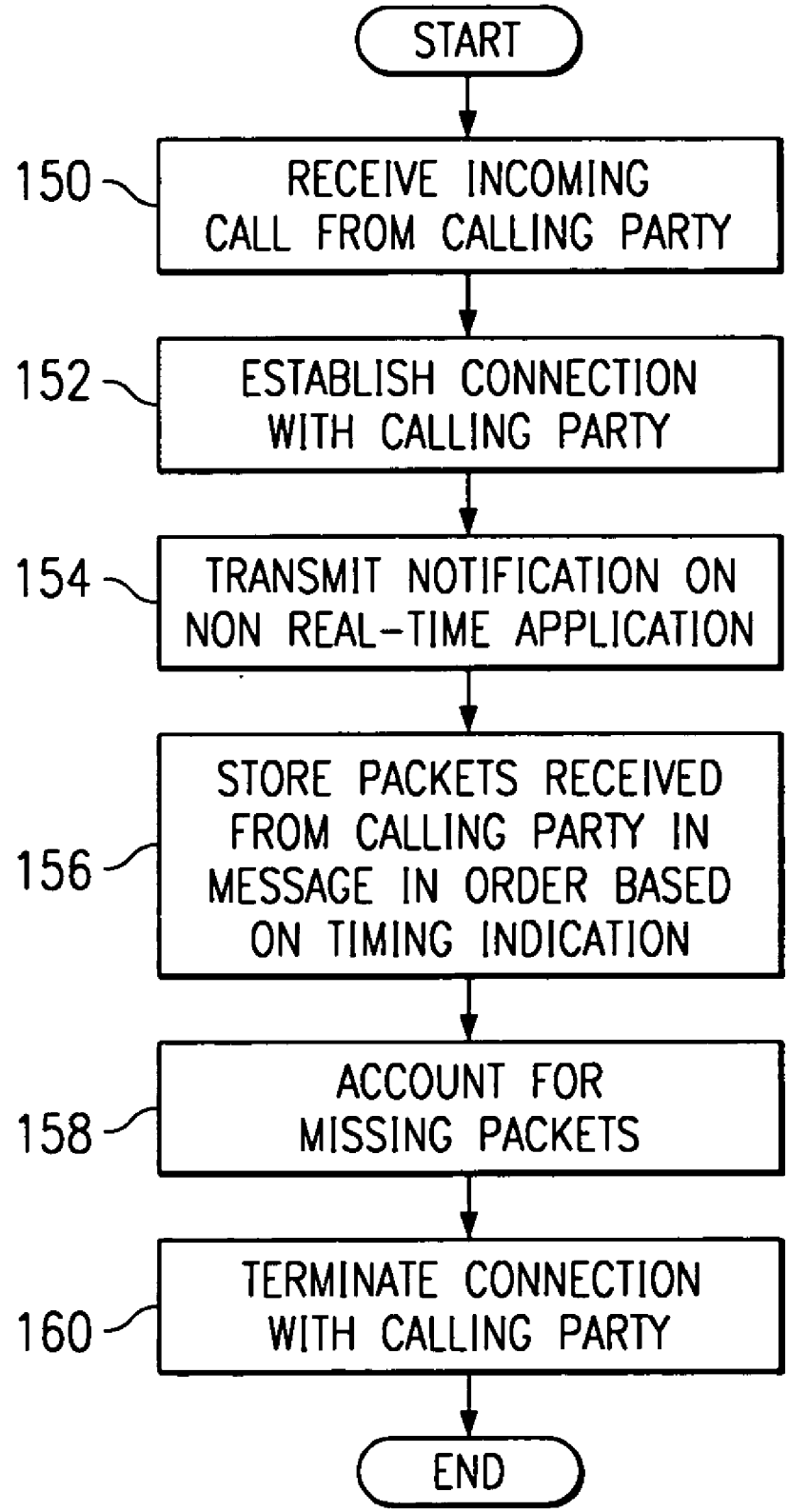

METHOD AND SYSTEM FOR CALL ANSWER WHILE CONNECTED TO VOICE MAIL

BACKGROUND OF THE INVENTION

Telecommunication networks include circuit-switched networks such as plain old telephone service (POTS) and packet-switched networks such as the Internet protocol (IP) network to transport voice and data between remote end users. The circuit-switched networks utilize transmission paths dedicated to specific users for the duration of a call and employ continuous, fixed bandwidth transmission. The packet-switched networks allow dynamic bandwidth, and can be connectionless networks with no dedicated path or connection-oriented networks with virtual circuits having dedicated bandwidth along a predetermined path. Because packet-switched networks allow traffic from multiple users to share communication links, these networks use available bandwidth more efficiently than circuit-switched networks.

IP networks are connectionless packet-switched networks that break up streams of information into addressable packets. Each IP packet includes source and destination addresses and can take any available route between the source and destination. The IP packets are transmitted independently and then reassembled in the proper sequence at the destination.

In IP and other networks, voice mail systems are used to record an audio message from a calling party for an absent, busy or otherwise unavailable called party. Although most telephony systems allow for multiple lines, line appearances or call waiting, such systems do not allow a party leaving a message with voice mail to take an incoming call without terminating the voice mail connection or putting the connection on hold, in which case an awkward pause is left in the voice mail recording.

SUMMARY OF THE INVENTION

The present invention provides a method and a system for call answer while connected to voice mail that substantially reduce or eliminate problems and disadvantages associated with previous systems and methods. In particular, the present invention allows a party leaving a message with voice mail to answer an incoming call and thereafter return to voice mail without causing an anomaly in the message.

In accordance with one embodiment of the present invention, a method and system for call answer while connected to voice mail includes generating real-time packets for transmission of a message toward a voice mail system. Generation of the real-time packets is interrupted upon a call answer by a party generating the message. Generation of the real-time packets for transmission of the message toward the voice mail system is resumed after a delay associated with the call answer. An indication is provided to voice mail system that the real-time packets generated subsequent to the delay follow the real-time packets generated prior to the delay in the message by a time amount less than the delay.

More specifically, in accordance with a particular embodiment of the present invention, an indication is provided to the voice mail system that the real-time packets generated subsequent to the delay substantially immediately or immediately follow the real-time packets generated prior to the delay in the message. The indication may be an in-band notification using time stamps, sequence numbers and other timing indicators or an out-of-band control signal.

Technical advantages of the present invention include providing a method and system for call answer while connected to voice mail. In a particular embodiment, the party leaving a message with voice mail may take an incoming call and thereafter return to the message without causing an anomaly in the message. As a result, pauses by the party leaving the message in voice mail are transparent to the message recorded by the voice mail system.

Another technical advantage of one or more embodiments of the present invention includes providing a method and system for pausing a stream of information transmitted in a real-time format that is transparent to a non real-time application receiving the information. In a particular embodiment, the sequence number and/or time stamp of packets forming the stream of information are suspended, or frozen at their current state during pauses with subsequent packets after the pause resuming at the previous sequence number and/or time stamp. As a result, a message or other stream of information is stored in voice mail or other non real-time application without unnecessary filler information and played back without pauses. In addition, signaling events are not required between the transmitting and receiving equipment, thereby reducing control information on the network. In another embodiment, signaling events may be used between the transmitting and recording equipment. In this embodiment, the sequence number and/or time stamps of the real-time format need not be controlled by the transmitting device.

Other technical advantages of the present invention will be readily apparent to one skilled in the art from the following figures, description, and claims.

BRIEF DESCRIPTION OF THE DRAWINGS

For a more complete understanding of the present invention and its advantages, reference is now made to the following description taken in conjunction with the accompanying drawings, in which:

FIG. 5 is a flow diagram illustrating a method for recording a voice mail message in accordance with one embodiment of the present invention.

DETAILED DESCRIPTION OF THE INVENTION

Figure 1:
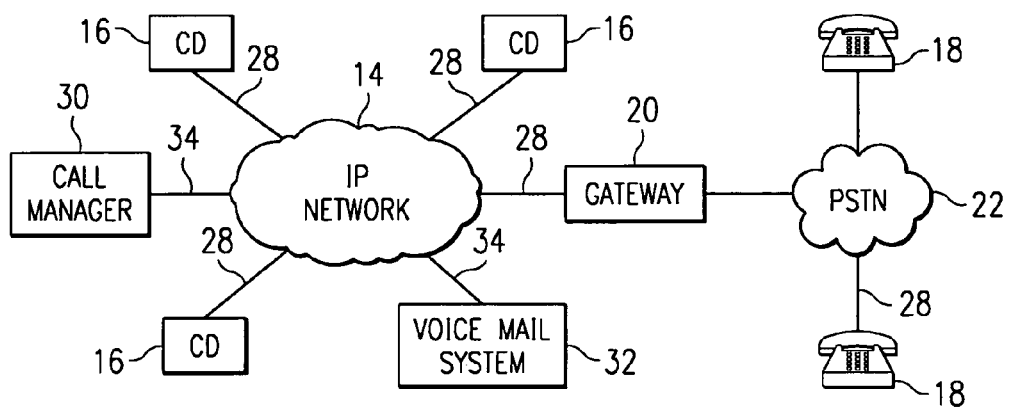
FIG. 1 is a block diagram illustrating a communications system in accordance with one embodiment of the present invention.

FIG. 1 illustrates a communications system 12 in accordance with one embodiment of the present invention. In this embodiment, the communications system 12 is a distributed system transmitting audio, video, voice, data and other suitable types of real-time and non-real time traffic between source and destination endpoints.

Referring to FIG. 1, the communications system 12 includes a network 14 connecting a plurality of communication devices 16 to each other and to standard analog telephones 18 through a gateway 20 and the public switched telephone network (PSTN) 22. The communication devices 16, standard analog telephones 18 and gateway 20 are connected to the network 14 and/or PSTN 22 through twisted pair, cable, fiber optic, radio frequency, infrared, microwave and/or any other suitable wireline or wireless link 28.

In one embodiment, the network 14 is the Internet, a wide area network (WAN), a local area network (LAN) or other suitable packet-switched network. In the Internet embodiment, the network 14 transmits Internet Protocol (IP) packets. Telephony voice information is transmitted in the voice over IP (VoIP) format. Real-time IP packets such as VoIP packets are encapsulated in real-time transport protocol (RTP) packets for transmission over the network 14. It will be understood that the network 14 may comprise any other suitable type of network and that traffic may be otherwise suitably transmitted using other protocols and formats.

The communication devices 16 are real-time applications that play traffic as it is received, or substantially as it is received into which packet delivery cannot be interrupted without severely degrading performance. The communication devices 16 comprise IP or other digital telephones, personal and other suitable computers or computing devices, personal digital assistants (PDAs), cell or other mobile telephones or any other device capable of communicating real-time audio, video and/or other information over the network 14. The communication devices 16 also communicate control information with the network 14 to control call setup, teardown and processing as well as call services.

In the Internet embodiment, the communication devices 16 communicate voice traffic in the VoIP format. The standard analog telephones 18 communicate standard telephony signals through PSTN 22 to the gateway 20. At the gateway 20, the signals are converted to IP packets in the VoIP format. As previously described, the IP packets from the communication devices 16 and the gateway 20 are encapsulated in the RTP protocol for transmission over the network 14.

The network 14 includes a call manager 30 and a voice mail system 32 or other suitable non real-time application such as an interactive voice response (IVR) system. The call manager 30 and the voice mail system 32 may be located in a central facility or have their functionality distributed across and/or at the periphery of the network 14. The call manager 30 and the voice mail system 32 are connected to the network 14 by any suitable type of wireline of wireless link 34.

In another embodiment, the network 14 may operate without the call manager 30, in which case the communication devices 16 may communicate control information directly with each other or other suitable network elements. In this embodiment, services are provided by the communication devices 16 and/or other suitable network elements.

The call manager 30 manages calls in the network 14. A call is any communication session between two or more parties. The parties may be persons and/or equipment such as computers. The sessions may include real-time connections, connections having real-time characteristics and/or non real-time connections.

The call manager 30 is responsive to service requests from the communication devices 16 and the standard telephones 18. For example, the call manager 30 may provide voice mail, bridging, multicasting, call hold and other suitable services for the communication devices 16 and standard telephones 18. In one embodiment, the call manager 30 is operable to identify real-time and/or non real-time applications to and/or for communication devices 16 and other network elements to support call answer while connected to voice mail or other non real-time application services. The call manager 30 provides services by performing the services, controlling performance of the services, delegating the services and/or by otherwise initiating the services.

The voice mail system 32 is a non real-time application. Thus, while the voice mail system 32 receives real-time voice traffic, the traffic is being recorded for a later use. The voice mail system 32 records voice messages for a busy, absent or otherwise unavailable called party.

Typically, unanswered calls to a called party are automatically switched from the communication device 16 of the called party to the voice mail system 32 by the call manager 30 after a predefined number of rings. As described in more detail below, the call manager 30 in connection with the voice mail system 32 and a called party communication device 16 allows a party leaving a message with voice mail to answer an incoming call and thereafter return to voice mail without causing an anomaly in the message.

Figure 2:
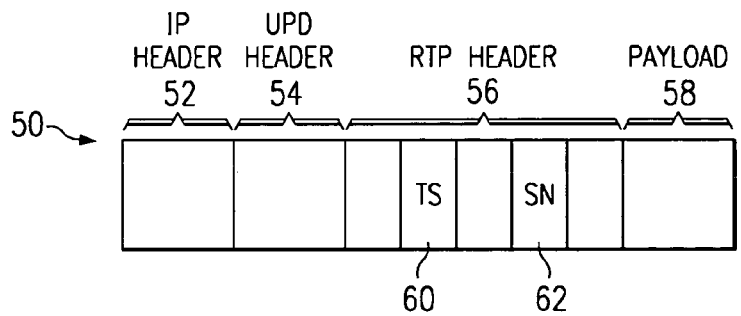
FIG. 2 is a block diagram illustrating a real-time transport protocol (RTP) packet for communicating information over the communications system of FIG. 1 in accordance with one embodiment of the present invention.

FIG. 2 illustrates an RTP packet for transmission of real-time traffic over the communications system 12 in accordance with one embodiment of the present invention. Real-time traffic comprises traffic generated or transmitted in real-time or including real-time information such as voice traffic.

Referring to FIG. 2, the RTP packet 50 includes an IP header 52, a user datagram protocol (UDP) header 54, an RTP header 56 and a payload 58. The IP header 52 includes source IP address and destination IP address for directing the RTP packet in the network 14. Traffic is directed by switching the traffic, routing the traffic or otherwise forwarding the traffic along a predefined path or between predefined endpoints.

The UDP header 54 provides a source port, a destination port and a sequence number. The RTP header 56 includes timing indicators to allow reordering of RTP packets at a destination endpoint and determination of whether any packets have been dropped or lost during transmission over the network 14. The timing indicators may be any suitable type of information in one or more segments of a packet operable alone or in combination with other information to determine an order, sequence or other relative or absolute temporal placement of RTP packets 50. The payload 58 carries voice or other information being communicated in the RTP packet 50.

In one embodiment, the timing indicators of the RTP header 56 include a time stamp 60 and a sequence number 62. For RTP packets i and i+1, $S_i < S(i+1)$ and $T(i+1) = T(i) + t$ where t is the length of packet T(i) in number of samples. The time stamp 60 and the sequence number 62 indicate to a destination device the order of the RTP packets 50, when to play the audio samples and whether any intervening RTP packets 50 have been lost or dropped by the network 14. Accordingly, by controlling the time stamp 60 and sequence number 62 or other timing indicator of the RTP header 56, a source communication device 16 can control treatment of the RTP packet 50 and real-time voice playout by a destination device.

In a particular embodiment, the time stamp 60 and/or sequence number 62 may be controlled by the communication device 16 to suspend, freeze or otherwise temporarily stop incrementation for a connection for a prolonged or other period, or delay, and then later resume incrementation beginning at or otherwise using the previous time stamp 60 and/or sequence number 62 to indicate to a destination device that no temporal lapse has occurred or otherwise ensure the audio is properly played with little or none of the delay.

Figure 3:
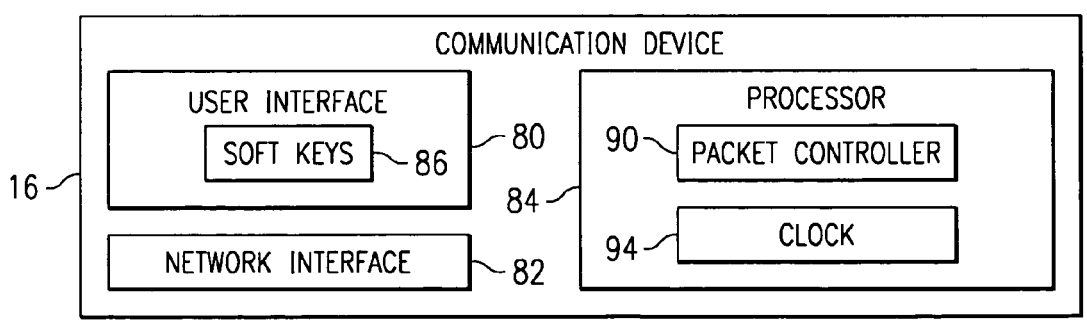
FIG. 3 is a block diagram illustrating details of a communication device for the communications system of FIG. 1 in accordance with one embodiment of the present invention.

FIG. 3 illustrates detail of the communication device 16 in accordance with one embodiment of the present invention. In this embodiment, the communication device 16 is a VoIP telephone connected to the network 14 over a data cable. The communication device 16 may include other or different suitable elements for communicating traffic over the network 14.

Referring to FIG. 3, the communication device 16 includes a user interface 80, a network interface 82 and a processor 84. The user interface 80, network interface 82, processor 84 and other elements of the communication device comprise logic encoded in media. The logic comprises functional instructions for carrying out programmed tasks. The media comprises computer disks or other suitable computer-readable media, application specific integrated circuits (ASIC), field programmable gate arrays (FPGA) or other suitable specific or general purpose processors, transmission media and other suitable media in which logic may be encoded and utilized.

The user interface 80 is a graphical, text base and/or other suitable interface operable to display commands and receive requests and selections from end users. In one embodiment, the user interface 80 includes soft keys 86 for selection by the user. The features associated with each of the soft keys 86 vary depending on the state of the communication device 16. As used herein, each means every one of at least a subset of the identified items.

The network interface 82 receives and transmits data to and from the network 14. In one embodiment, the network interface 82 includes an IP address and one or more ports for identifying the communication device 16 and/or application to other devices on the network. The processor 84 is a general purpose or other suitable processor processing logic and other operating instructions for the communication device 16.

The processor 84 includes a packet controller 90 and clock 94. The packet controller 90 codes and decodes RTP packets transmitted on and received from the network 14. A clock 94 generates time stamps 60 for the RTP packets.

The packet controller 90 also tracks the sequence number 62 of an output audio stream and updates the number for each successive packet to allow the packets to be properly reordered at their destination. The packet controller 90 further inserts time stamps 60 derived from the clock 94. In addition, the packet controller 90 may store, modify and adapt time stamps 60 and sequence numbers 62 when the user switches between two or more connections including a voice mail connection and an active call such that the switching is transparent to the voice mail system 32 or other non real-time application.

Figure 4:
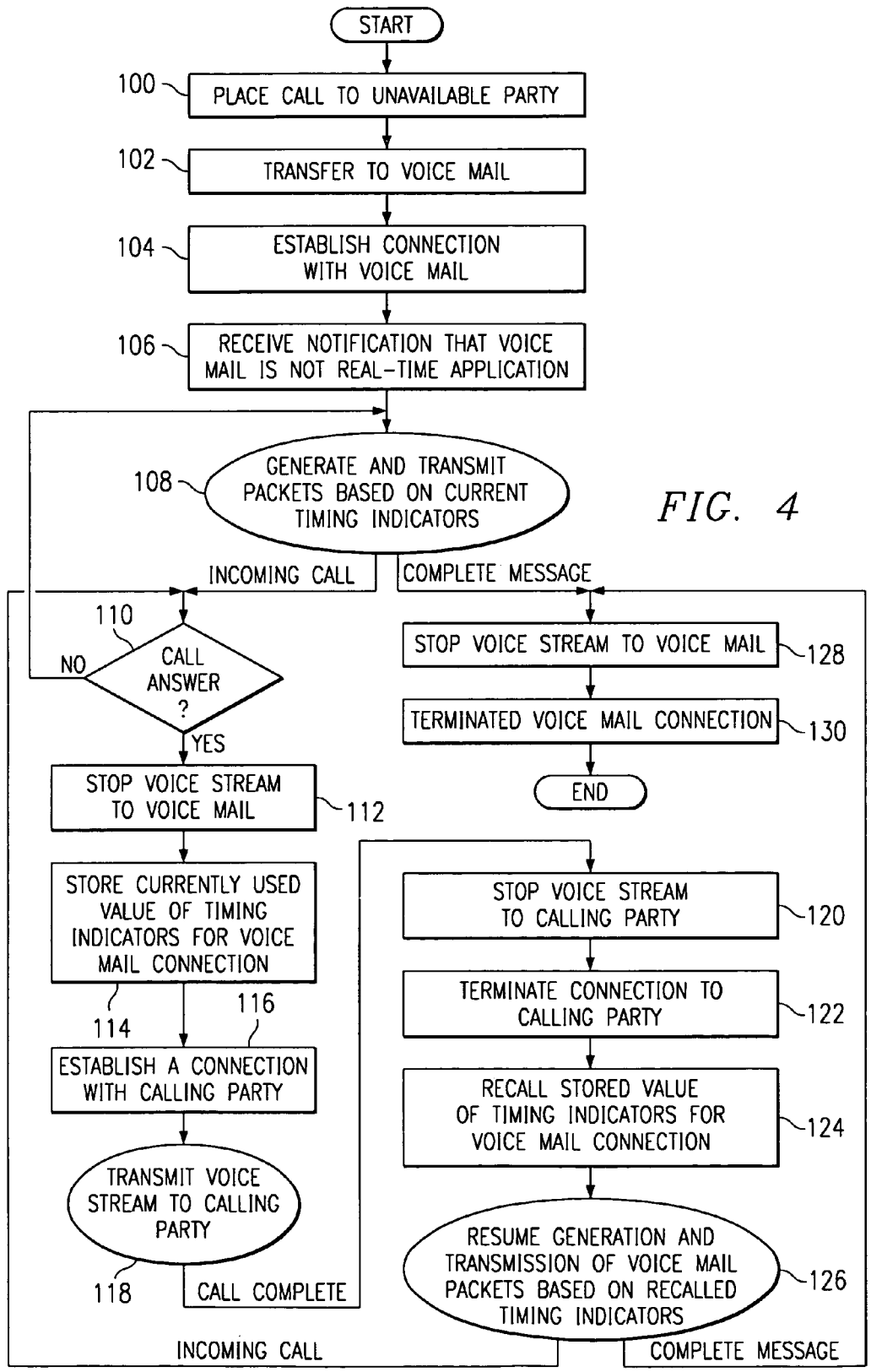
FIG. 4 is a flow diagram illustrating a method for call answer while connected to voice mail in accordance with one embodiment of the present invention.

FIG. 4 illustrates a method for calling answer while connected to voice mail in accordance with one embodiment of the present invention. In this embodiment, in-band timing indicators are used to effectively pause the voice mail application 32. In another embodiment, out-of-band signaling events or other suitable in-band signaling events between the call manager 30 and/or communication device 16 and the voice mail application 32 may be used to effectively pause the voice mail application 32. In that embodiment, timing indicators in packets following a delay need not be adapted. Thus, timing indicators at the time of the delay need not be frozen, stored nor later recalled.

Referring to FIG. 4, the method begins at step 100 in which a call is placed to a busy, absent or otherwise unavailable party. At step 102, the call is transferred to the voice mail system 32.

Proceeding to step 104, a connection is established between the communication device 16 of the user placing the call and the voice mail system 32. At step 106, the communication device 16 of the user receives notification that the voice mail system 32 is a non real-time application which may be an indication that the RTP stream to the connected device does not have a real-time requirement. The notification may be a signaling event from the call manager 30 or other call control application if the central call control used or from the voice mail application 32 if distributed call control is used. Accordingly, the communication device 16 can interrupt generation and transmission of packets to the application without degrading performance of the application.

Next, at state 108, the communication device 16 transmits a voice stream from the user to the voice mail system 32 in packets based on current and/or regular timing indicators. In one embodiment, the packets are RTP packets and the timing indicators comprise the time stamp 60 and sequence number 62. The packets are stored by the voice mail system 32 as a message for the called party.

In response to an call incoming to the user leaving the message, state 108 transitions to decisional step 110. At decisional step 110, the user may select whether he or she wants to answer the incoming call. If the user elects to not answer the incoming call or does not elect to answer the incoming call, the No branch of decisional step 110 returns to state 108 in which the user continues to leave the message. The user may elect to answer or not to answer the incoming call using the soft key buttons 86.

If the user elects to answer the incoming call, the Yes branch of decisional step 110 leads to step 112. At step 112, the user's voice stream to the voice mail is stopped and the voice mail connection may be put on hold. At step 114, the currently used value of one or more timing indicators are frozen at their current state for the voice mail connection by being stored. By storing the current state of the timing indicators for the voice mail connection, the timing indicators may continue to be incremented and regularly used for other connections such as the incoming call. At step 116, an active call connection is established between the user and the calling party. Thus, the connection to the voice mail system 32 is maintained, but not used while the user remains on the answered call.

Proceeding to state 118, the communication device 116 transmits the user's voice stream to the calling party over the calling party connection during the duration of the call. In response to a completion of the call, state 118 transitions to step 120 in which the user's voice stream to the calling party is stopped or otherwise suitably terminated. At step 122, the connection to the calling party is likewise terminated.

Next, at step 124, the stored values of the timing indicators for the voice mail connection are recalled. The recalled timing indicators include the time stamp 60 and/or the sequence number 62 preceding the delay caused by the call answer. Proceeding to state 126, transmission of the user's voice stream is resumed to the voice mail system 32 in packets based on the recalled timing indicators. In one embodiment, a first packet after resumption of the voice stream to the voice mail system 32 includes the time stamp 60 and/or sequence number 62 recalled from memory. Each successive packet includes a time stamp 60 and sequence number 62 incremented from the previous packet. For example, if time stamp T(m) is stored at the time of the interruption, the voice mail connection may be resumed with a packet having time stamp T(m), followed by a packet having time stamp T(m+1), and so on. In this way, it will appear to the voice mail system 32 based on the timing indicators that no interruption has occurred and no pause will be stored in the message.

In response to another incoming call state 126 transitions back to decisional step 110, whereas previously described, the user may elect to answer the call or to continue with the message. If the user elects to continue with the message, the user will continue generating and transmitting the voice stream in state 126 using timing indications specific to the connection. If the user elects to take the call, the timing indications then being used are stored for use after the call.

Upon completion of the message, states 108 and 126 each transition to step 128 in which the voice stream to voice mail is terminated. Next, at step 130, the voice mail connection is terminated. Step 130 leads to end the process by which call answer services are provided to a called party while connected to voice mail.

FIG. 5 illustrates a method for recording a voice mail message in the voice mail system 32 in accordance with one embodiment of the present invention. In this embodiment, in-band timing indicators are used to effectively pause the voice mail application 32 during a pause in generation of the voice mail audio stream at the communication device 16. In another embodiment, as previously described, signaling events between the call manager 30 and/or communication device 16 and the voice mail application 32 may be used to pause a voice mail application 32 during a delay at the communication device 16. In that embodiment, the signaling events are used by the voice mail application 32 to account for any missing packets.

Referring to FIG. 5, the method begins at step 150 in which an incoming call is received from a calling party. At step 152, a connection is established with the calling party. Next, at step 154, a voice mail system 32 transmits a notification that it is a non real-time application which may include, in some networks, not sending a real-time requirement signal. Alternatively, if a centralized call control paradigm is used, the call manager 30 or other suitable network element may indicate that the voice mail system 32 does not have a real-time requirement. This informs the communication or other device connected to the voice mail system 32 that packet transmission may be interrupted for call answer and other intervening events.

Next, at step 156, the voice mail system 32 stores packets received from the calling party as a message to a file, or to other suitable output device in an order based on timing indicators included in the packets. For RTP packets, the timing indicators include the time stamp 60 and the sequence number 62. In this embodiment, the voice mail system 32 saves packets using the sequence number 62 to order the packets and the time stamp 60 to compensate for silence impression.

During receipt of the message, the voice mail system 32 accounts for missing packets at step 158. As previously described, because timing indicators are frozen for at least the connection during the interruption and the packet stream begins at a next time stamp 60 and/or sequence number 62 after delay, the delay is transparent to the voice mail system 32 and no filling need be done for missing packets. Thus, no pause or other break is inserted into the message or other output to account for the time during which the voice mail system 32 was not receiving audio. At step 160, the connection with the calling party is terminated. In this way, the voice mail system is able to store message that included a pause when generated without the pause.

In one embodiment, the packets generated and transmitted after the delay indicate that they immediately follow or substantially immediately follow packets prior to the delay. The packets substantially immediately follow the previous packets if the delay is unnoticeable by the called party listening to the message, is at least an order of magnitude shorter than the delay or less than a second. In a specific embodiment, a command or other suitable packet may be periodically generated and transmitted to the voice mail system 32 to prevent automatic disconnect by the voice mail system 32. The command packet may be generated by the call manager 30, if central call control is used or by the communication device 16 or other stand alone application if distributed call control is used. In either or other suitable embodiments, packets generated and transmitted after the delay will follow the intervening packets periodically transmitted during the delay.

Although the present invention has been described with several embodiments, various changes and modifications may be suggested to one skilled in the art. It is intended that the present invention encompass such changes and modifications as fall within the scope of the appended claims.

What is claimed is:

1. A method for call answer while connected to voice mail, comprising:
generating real-time packets for transmission of a message toward a voice mail system;
interrupting generation of the real-time packets upon a call answer by a party generating the message;
resuming generation of the real-time packets for transmission of the message toward the voice mail system after a delay associated with the call answer;
indicating to the voice mail system that the real-time packets generated subsequent to the delay follow the real-time packets generated prior to the delay in the message by a time amount less than the delay; and
periodically transmitting a packet during the delay to prevent an automatic disconnect by the voice mail system.

2. The method of claim 1, further comprising transmitting the real-time packets as they are generated.

3. The method of claim 1, further comprising indicating to the voice mail system that the real-time packets generated subsequent to the delay substantially immediately follow the real-time packets generated prior to the delay in the message.

4. The method of claim 1, further comprising indicating to the voice mail system that the real-time packets generated subsequent to the delay immediately follow the real-time packets generated prior to the delay in the message.

5. The method of claim 1, wherein the indication to the voice mail system that the real-time packets generated subsequent to the delay follow the real-time packets generated prior to the delay in the message by a the time amount less than the delay comprises an in-band notification.

6. The method of claim 5, wherein the in-band notification comprises timing indicators in the real-time packets.

7. The method of claim 6, wherein the timing indicators comprise time stamps.

8. The method of claim 6, wherein the timing indicators comprise sequence numbers.

9. The method of claim 1, wherein the indication to the voice mail system that the real-time packets generated subsequent to the delay follow the real-time packets generated prior to the delay in the message by the time amount less than the delay comprises an out-of-band signal between a device generating the real-time packets and the voice mail system.

10. The method of claim 1, wherein the packets comprise real-time transport protocol (RTP) packets.

11. The method of claim 10, wherein the RTP packets each comprise a time stamp and sequence number operable to indicate to the voice mail system that the RTP packets generated subsequent to the delay substantially immediately follow the RTP packets generated prior to the delay in the message.

12. The method of claim 1, further comprising:
storing a value of a timing indicator upon the call answer by the party generating the message; and
generating the real-time packets for transmission of the message after the delay based on the value of the timing indicator.

13. The method of claim 12, generating real-time packets for transmission of the message after the delay based on the value of the timing indicator comprising generating a first real-time packet after the delay using the value of the timing indicator and generating each successive real-time packet by incrementing the timing indicator of the previous packet.

14. The method of claim 13, generating the first real-time packet after the delay using the value of the timing indicator comprising including the value of the timing indicator in the first real-time packet after the delay.

15. A system for call answer while connected to voice mail, comprising:
logic encoded in media;
the logic operable to generate real-time packets for transmission of a message toward a voice mail system, to interrupt generation of the real-time packets upon a call answer by a party generating the message, to resume generation of the real-time packets for transmission of the message toward the voice mail system after a delay associated with the call answer, to indicate to the voice mail system that the real-time packets generated subsequent to the delay follow the real-time packets generated prior to the delay in the message by a time amount less than the delay, and to periodically transmit a packet during the delay to prevent an automatic disconnect by the voice mail system.

16. The system of claim 15, the logic further operable to transmit the real-time packets as they are generated.

17. The system of claim 15, the logic further operable to indicate to the voice mail system that the real-time packets generated subsequent to the delay substantially immediately follow the real-time packets generated prior to the delay in the message.

18. The system of claim 15, the logic further operable to indicate to the voice mail system that the real-time packets generated subsequent to the delay immediately follow the real-time packets generated prior to the delay in the message.

19. The system of claim 15, wherein the indication to the voice mail system that the real-time packets generated subsequent to the delay follow the real-time packets generated prior to the delay in the message by a time amount less than the delay comprises an in-band notification.

20. The system of claim 19, wherein the in-band notification comprises timing indicators in the real-time packets.

21. The system of claim 20, wherein the timing indicators comprise time stamps.

22. The system of claim 20, wherein the timing indicators comprise sequence numbers.

23. The system of claim 15, wherein the indication to the voice mail system that the real-time packets generated subsequent to the delay follow the real-time packets generated prior to the delay in the message by the time amount less than the delay comprises an out-of-band signal between a device generating the real-time packets and the voice mail system.

24. The system of claim 15, wherein the packets comprise real-time transport protocol (RTP) packets.

25. The system of claim 24, wherein the RTP packets each comprise a time stamp and a sequence number operable to indicate to the voice mail system that the RTP packets generated subsequent to the delay substantially immediately follow the RTP packets generated prior to the delay in the message.

26. The system of claim 15, the logic further operable to store a value of a timing indicator upon the call answered by the party generating the message and to generate the real-time packets for transmission of the message after the delay based on the value of the timing indicator.

27. The system of claim 26, the logic operable to generate real-time packets for transmission of the message after the delay based on the value of the timing indicator by generating a first real-time packet after the delay using the value of the timing indicator and generating each successive real-time packet by incrementing the timing indicator of the previous packet.

28. The system of claim 27, the logic operable to generate the first real-time packet after the delay using the value of the timing indicator by including the value of the timing indicator in the first real-time packet after the delay.

29. A system for call answer while connected to voice mail, comprising:
means for generating real-time packets for transmission of a message toward a voice mail system;
means for interrupting generation of the real-time packets upon a call answer by a party generating the message;
means for resuming generation of the real-time packets for transmission of the message toward the voice mail system after a delay associated with the call answer;
means for indicating to the voice mail system that the real-time packets generated subsequent to the delay follow the real-time packets generated prior to the delay in the message by a time amount less than the delay and means for periodically transmitting a packet during the delay to prevent an automatic disconnect by the voice mail system.

30. The system of claim 29, further comprising means for transmitting the real-time packets as they are generated.

31. The system of claim 29, further comprising means for indicating to the voice mail system that the real-time packets generated subsequent to the delay substantially immediately follow the real-time packets generated prior to the delay in the message.

32. The system of claim 29, further comprising means for indicating to the voice mail system that the real-time packets generated subsequent to the delay immediately follow the real-time packets generated prior to the delay in the message.

33. The system of claim 29, wherein the indication to the voice mail system that the real-time packets generated subsequent to the delay follow the real-time packets generated prior to the delay in the message by a time amount less than the delay comprises an in-band notification.

34. The system method of claim 33, wherein the in-band notification comprises timing indicators in the real-time packets.

35. The system of claim 33, wherein the timing indicators comprise time stamps.

36. The system of claim 33, wherein the timing indicators comprise sequence numbers.

37. The system of claim 29, wherein the indication to the voice mail system that the real-time packets generated subsequent to the delay follow the real-time packets generated prior to the delay in the message by the time amount less than the delay comprises an out-of-band signal between a device generating the real-time packets and the voice mail system.

38. The system of claim 29, wherein the packets comprise real-time transport protocol (RTP) packets.

39. The system of claim 38, wherein the RTP packets each comprise a time stamp and sequence number operable to indicate to the voice mail system that the RTP packets generated subsequent to the delay substantially immediately follow the RTP packets generated prior to the delay in the message.

40. The system of claim 29, further comprising:
means for storing a value of a timing indicator upon the call answer by the party generating the message; and
means for generating the real-time packets for transmission of the message after the delay based on the value of the timing indicator.

41. The system of claim 40, the means for generating real-time packets for transmission of the message after the delay based on the value of the timing indicator comprising means for generating a first real-time packet after the delay using the value of the timing indicator and generating each successive real-time packet by incrementing the timing indicator of the previous packet.

42. The system of claim 41, the means for generating the first real-time packet after the delay using the value of the timing indicator comprising means for including the value of the timing indicator in the first real-time packet after the delay.

43. A method for interrupting of a real-time connection to a non real-time application, comprising:
generating real-time packets for transmission of an information stream toward a non-real time application;
interrupting generation of the real-time packets upon an intervening event;
resuming generation of the real-time packets for transmission of the information stream toward the non real-time application after a delay associated with the intervening event;
indicating to the non real-time application that the real-time packets generated subsequent to the delay follow the real-time packets generated prior to the pause in the information stream by a time less than the delay; and
periodically transmitting a packet during the delay to prevent an automatic disconnection by the non real-time application.

44. The method of claim 43, further comprising transmitting the real-time packets as they are generated.

45. The method of claim 43, further comprising indicating to the non real-time application that the real-time packets generated subsequent to the delay substantially immediately followed the real-time packets generated prior to the delay in the information stream.

46. The method of claim 43, wherein the indication to the non real-time application that the real-time packets generate subsequent to the delay follow the real-time packets generated prior to the delay in the message by the time amount less than the delay comprises an in-band notification.

47. The method of claim 46, wherein the in-band notification comprises timing indicators in the real-time packets.

48. The method of claim 43, further comprising:
storing a value of a timing indicator upon the intervening event; and
generating the real-time packets for transmission of the information stream after the delay based on the value of the timing indicator.

49. The method of claim 43, wherein the non real-time application comprises an application recording the information stream.

50. The method of claim 43, wherein the intervening event comprises an intervening connection.

51. The method of claim 43, wherein the information stream comprises an audio stream.

52. The method of claim 43, wherein the real-time packets comprise timing indicators indicating to the non real-time application that the real-time packets generated after the delay immediately follow the real-time packets generated prior to the delay in the information stream.

53. The method of claim 43, wherein the packets are real-time transport protocol (RTP) packets.

54. The method of claim 43, further comprising:
establishing a connection with the non real-time application; and
receiving a notification from the non real-time application that it comprises a non real-time application.

\* \* \* \* \*